United States Patent

Helle et al.

(10) Patent No.: US 6,746,227 B2
(45) Date of Patent: Jun. 8, 2004

(54) TIRE TREAD DIE

(75) Inventors: Donald Edward Helle, Poland, OH (US); Ernest Wilford Looman, Jr., Tallmadge, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 213 days.

(21) Appl. No.: 09/884,668

(22) Filed: Jun. 19, 2001

(65) Prior Publication Data

US 2002/0190417 A1 Dec. 19, 2002

(51) Int. Cl.$^7$ .............................................. B29C 35/00
(52) U.S. Cl. ............................ 425/133.5; 425/192 R; 425/462
(58) Field of Search ........................ 425/131.1, 133.5, 425/190, 192 R, 462

(56) References Cited

U.S. PATENT DOCUMENTS

| | | | |
|---|---|---|---|
| 603,161 A | 4/1898 | Bagot | |
| 2,445,725 A | 7/1948 | Walker | |
| 4,308,083 A | 12/1981 | Toth, Jr. | 156/129 |
| 4,526,528 A | 7/1985 | Kline et al. | 425/133.5 |
| 4,556,376 A * | 12/1985 | Sievers et al. | 425/133.5 |
| 4,580,608 A | 4/1986 | Rampl | |
| 4,653,994 A | 3/1987 | Capelle | 425/131.1 |
| 4,698,245 A | 10/1987 | Schallmeier et al. | 428/33 |
| 4,739,811 A | 4/1988 | Rampl | |
| 5,017,118 A * | 5/1991 | Looman et al. | 425/133.5 |
| 5,397,616 A | 3/1995 | Aoki | 428/33 |
| 5,518,055 A | 5/1996 | Teeple et al. | 152/152.1 |
| 5,942,069 A | 8/1999 | Gerresheim et al. | 156/128.1 |
| 6,294,119 B1 * | 9/2001 | Nakamura | 425/462 |

FOREIGN PATENT DOCUMENTS

| | | |
|---|---|---|
| BR | PI9203878-6 A | 4/1994 |
| EP | 0878330 | 11/1998 |
| EP | 0881060 | 12/1998 |
| GB | 2058687 | 4/1981 |
| GB | 2066171 | 7/1981 |
| WO | WO9901299 | 1/1999 |

* cited by examiner

*Primary Examiner*—Robert Davis
*Assistant Examiner*—Joseph S Del Sole
(74) *Attorney, Agent, or Firm*—Brouse McDowell; Roger D. Emerson

(57) ABSTRACT

Providing a narrow strip of electrically conductive rubber extending from a lower undertread layer to the surface of the tread by positioning a slotted chimney block in an outer tread rubber passage of a tire tread die and having the chimney block passage in communication with a lower undertread passage of the tire tread die.

5 Claims, 2 Drawing Sheets

TIRE TREAD DIE

BACKGROUND OF THE INVENTION

1. Field of Invention

The present invention relates to the extrusion of a tire tread with a thin electrically conductive strip of material for discharging the electro static charges produced by a vehicle having tires with non-conducting rubber treads.

2. Description of the Related Art

In European patent application EP 0 925 903 A1, it is proposed to provide a narrow high conductive rubber strip at a widthwise center region of the tread. This is accomplished by adding a detachable sub insert block to the extrusion head insert block. In order to provide the precise installation of the sub insert block substantial machining and revision of the insert block has been required. Also the sub insert blocks were fabricated of sheet metal to provide a thin wall sheath portion and a base portion which is received in a cutout in the insert block. The sub insert blocks also had walls, which were tapered to direct flow of the high conductive rubber.

U.S. Pat. No. 5,397,616 is directed to a method of providing unvulcanized tread material at the bottom portions of tire grooves in the tire tread by extruding the tread with projecting portions of the base layer adjacent portions of the cap layer having grooves whereby the base layer is exposed at the groove bottoms in the manufactured tire. This exposure of the base layer is dependent upon the depth of the grooves and penetration of the cap layer and being recessed does not provide contact with the roadway as is required for discharging static electricity during operation of a vehicle.

SUMMARY OF THE INVENTION

With the present invention a narrow strip of conductive rubber is formed by conveying the conductive rubber a lower the undertread flow channel in a tire tread die through a passage into a chimney block positioned in the flow channel for the non-conductive tread rubber and through a slot in the chimney block. Not only is the narrow strip in position for discharging static electricity generated by the vehicle but the face of the strip at the tread surface is not smeared.

In accordance with one aspect of the invention there is provided a tire tread die comprising an outer tread passage for forming an electronically non-conductive rubber outer tread, a lower undertread passage for forming a lower undertread layer of electrically conductive rubber characterized by:

(a) a chimney block mounted in the outer tread passage and extending from an inner surface to an outer surface of the passage;

(b) a chimney block opening extending from one end of the chimney block to an opposite end;

(c) an undertread orifice in the outer tread passage in communication with the lower undertread passage and with the chimney block opening; and, (d) a slot in a downstream side of the chimney block in communication with the chimney block opening and extending between the one end and the opposite end of the chimney block for communicating a narrow strip of the lower undertread layer to the outer tread in the outer tread passage;

(e) a final die downstream of the outer tread passage and the lower undertread passage for receiving the lower undertread layer and the outer tread with the narrow strip of lower undertread layer extending from the undertread to an outer surface of the outer tread.

In accordance with another aspect of the invention, there is provided a method of forming a tire tread with a lower undertread layer of electrically conductive rubber and an upper tread having a narrow strip of electrically conductive undertread rubber extending from the lower undertread layer to the surface of the upper tread comprising:

(a) conveying the electrically conductive rubber of the lower undertread layer through a first passage of a tire tread die;

(b) conveying electrically nonconductive rubber of the outer tread through a second passage of the tire tread die;

(c) diverting a portion of the electrically conductive rubber of the lower undertread layer from the first passage to the second passage through an undertread opening in the first passage;

(d) conveying the electrically conductive rubber of the lower undertread layer from the undertread opening to a position extending across the second passage in an opening of a chimney block extending between opposite surfaces of the second passage;

(e) conveying the electrically conductive rubber of the lower undertread layer from the second passage through a slot in the chimney block opening to form the narrow strip in the upper tread and;

(f) conveying the lower undertread layer and the upper tread with the narrow strip into a final die having an opening in communication with the first passage and the second passage to position the upper tread with the narrow strip over the lower undertread layer and provide electrical conductivity of the tread.

In accordance with another aspect of the present invention, the chimney block may be welded to an upper plate of the outer tread passage to provide the narrow strip of the lower layer in the outer tread without smearing.

In accordance with another aspect of the present invention, the protrusion may have a flow splitting tapered end at the upstream side and tapered walls from the upstream side to the downstream side of the chimney block to divert the flow of the outer tread around the chimney block.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and herein.

DESCRIPTION OF THE PREFERRED EMBODIMENTS

Figure 1:
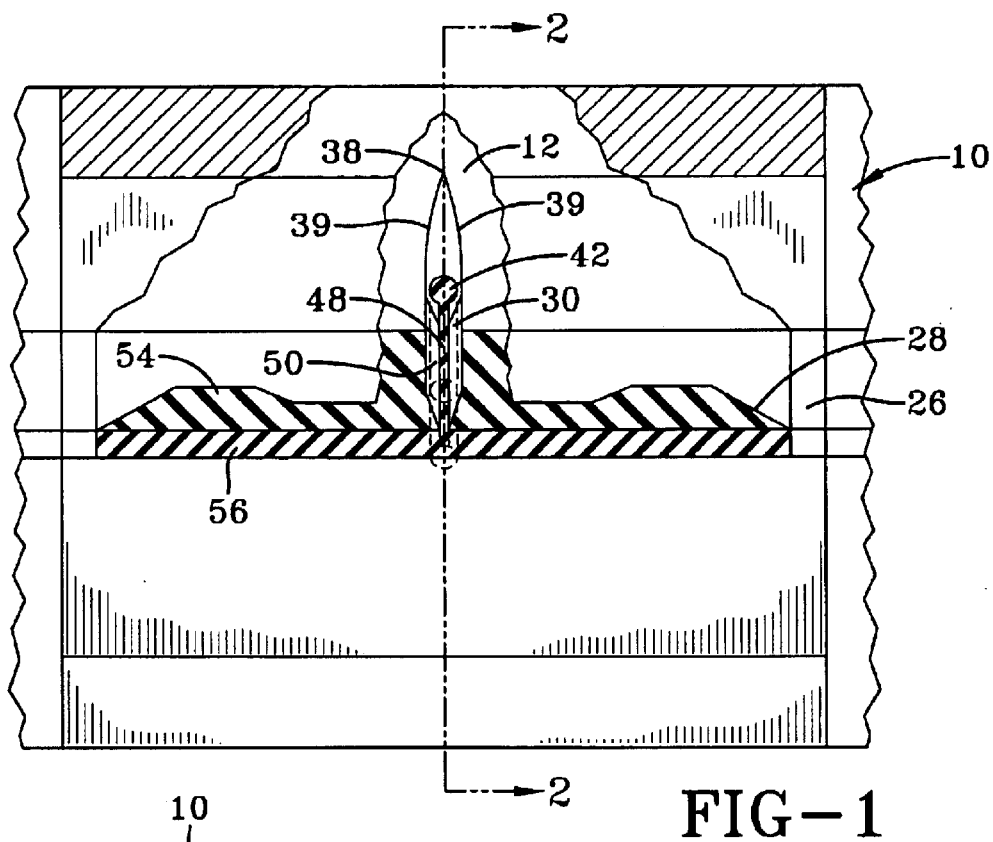
FIG. 1 is a fragmentary front elevation of a tire tread splice bar with a chimney block embodying the invention and with parts being broken away taken along the plane of line 1—1 in FIG. 2.
Figure 2:
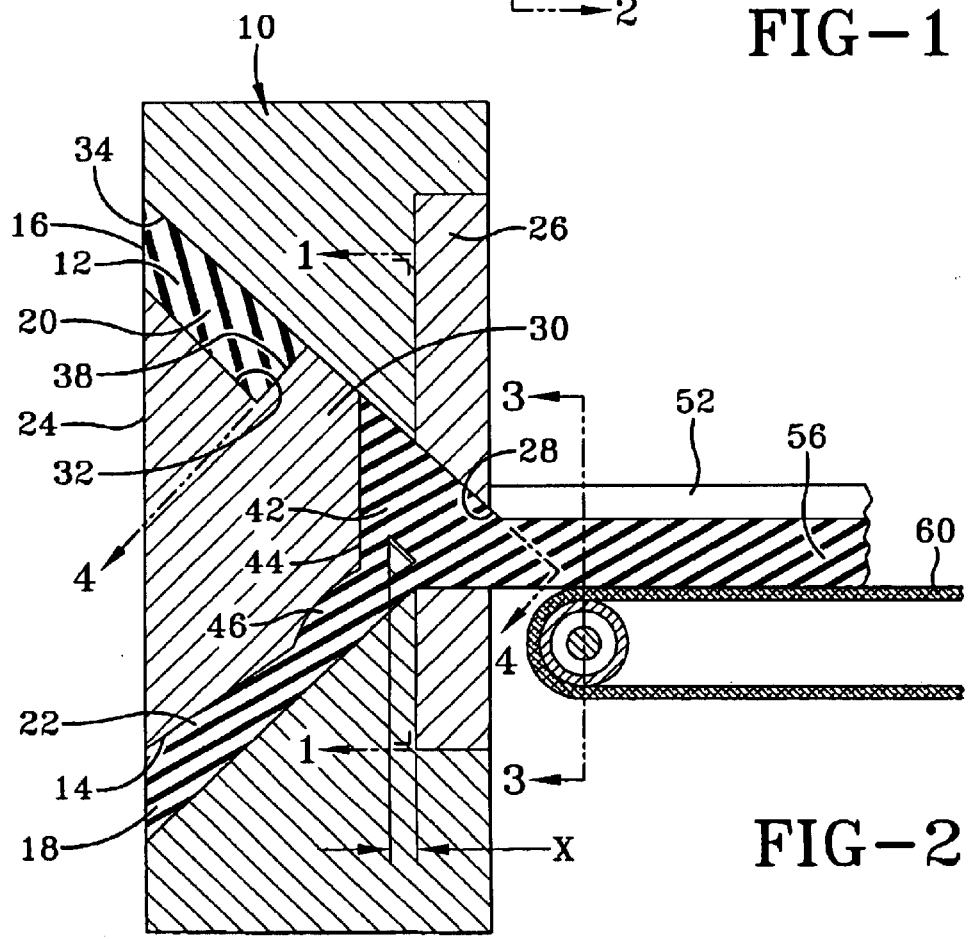
FIG. 2 is a sectional view taken along the plane of line 2—2 in FIG. 1 showing a conveyor for receiving the extruder tread.

Referring now to the drawings wherein the showings are for purposes of illustrating a preferred embodiment of the invention only and not for purposes of limiting the same, FIGS. 1 and 2 show a tire tread die 10 having an outer tread passage 12 and a lower undertread passage 14 in communication with rubber extruders (not shown) for feeding the tread material into the die at extruder openings 16 and 18. The outer tread 20 is of an electrically non-conductive rubber and the lower undertread 22 is of an electrically conductive rubber. The outer tread passage 12 and the lower undertread passage 14 extend from spaced apart positions at an extruder side 24 to a final die 26 having a final tread shaping opening 28.

A chimney block 30 is mounted in the outer tread passage 12 and extends from an inner surface 32 of the outer tread passage to surface 34 of the outer tread passage. The chimney block 30 may have a flow separating protrusion such as a flow splitting tapered upstream edge 38 for diverting the flow of the outer tread 20 of electrically nonconductive rubber around the chimney block.

A chimney block opening 42 may be provided by drilling a hole through the chimney block 30 from one end of the chimney block to an opposite end. Communication of the lower undertread passage 14 with the chimney block opening 42 may be provided by drilling the hole through the tire tread die 10 into the lower undertread passage. A recess 46 in the wall of the lower undertread passage 14 adjacent the lower undertread orifice 44 may be provided to guide the lower undertread rubber 22 from the lower undertread passage 14 into the undertread orifice 44 and from there into the chimney block opening 42 where needed.

In order to form a narrow strip through the nonconductive rubber of the conductive tread rubber 22 of the lower undertread, a slot 48 is cut in a downstream side 50 of the chimney block 30 extending between one end and an opposite end of the chimney block. The diameter D of a chimney block opening 42 and the width W of the slot 48 may vary according to the size of the tread. The width W of the slot 48 for this embodiment is 0.0788 inches (2 mm) and the diameter D is 0.1576 inches (4 mm). The distance X between the chimney block opening 42 and the face of the final die 26 for this embodiment is 0.1576 inches (4 mm). In other embodiments the distance X may be from 1 to 25 mm (0.0394 to 0.99 inches) and the diameter of the passage 42 may be from 2 to 10 mm (0.0788 to 3.94 inches).

Figure 3:
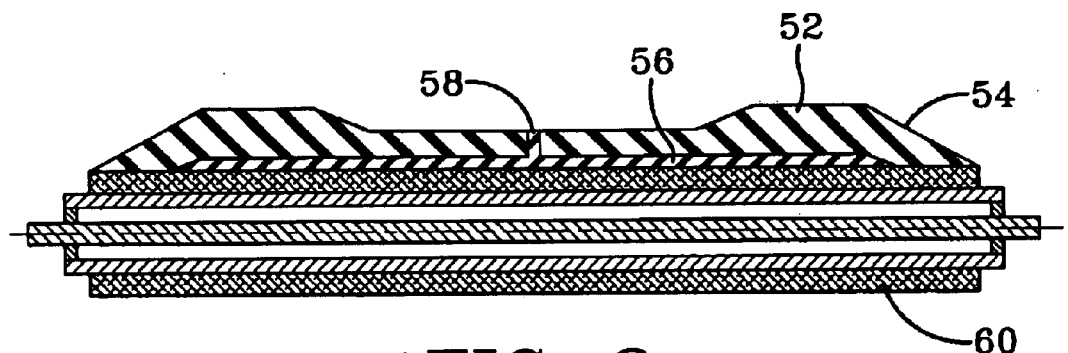
FIG. 3 is a sectional view of the extruded tread taken along the plane of line 3—3 in FIG. 2.
Figure 4:
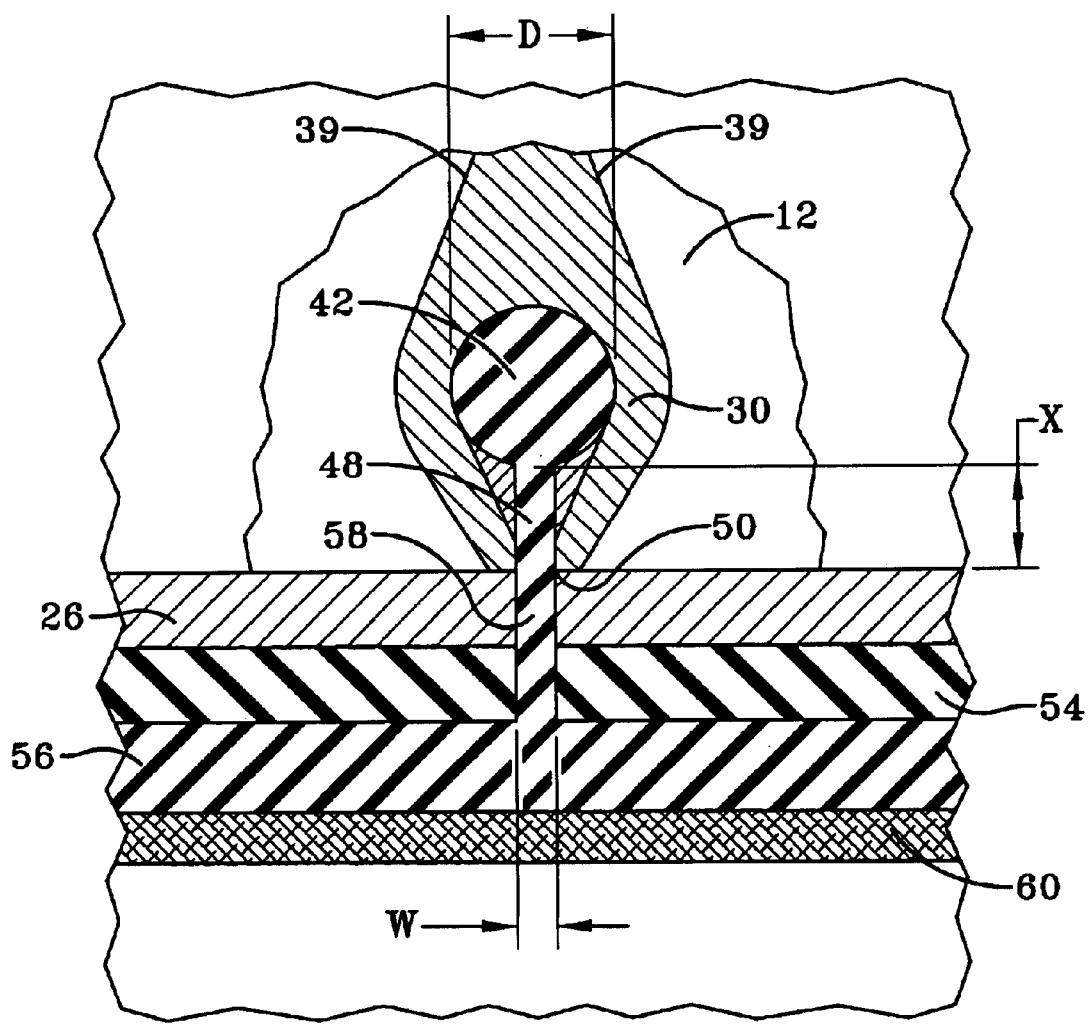
FIG. 4 is an enlarged fragmentary plan view of the chimney block of FIG. 1 taken along the plane of line 4—4 in FIG. 2 with parts being broken away.

As shown in FIGS. 2 and 3, a tire tread 52 is formed by the tire tread die 10 embodying the invention and has an outer tread 54 and a and a lower undertread 56 of electrically nonconductive rubber. A narrow strip 58 of the lower undertread rubber 22 extends from the lower undertread 56 to the surface 54 of the outer tread 52. In operation of the tire, the narrow strip 58 discharges static electricity generated by the vehicle.

Where the tire tread 52 has more than one lower undertread layer of electrically conductive rubber, the chimney block 30 may be positioned to convey the electrically conductive rubber from any lower undertread layer of the surface of the tread.

As shown in FIG. 2 a conveyor 60 may be provided to convey the extruded tire tread 52 to a suitable cutting station where the tread is cut to length. The tread 52 may then be conveyed to a tire building machine where it is applied to the plies being built on a drum in a manner well known to those skilled in the art. The assembled tire is then placed in a tire mold and the outer tread 52 formed with grooves and road engaging surfaces. The narrow strip 58 of undertread rubber 22 is positioned in a road engaging surface which may be at any position on the tread surface. In the present embodiment the strip 58 is positioned in a circumferential tread rib at the center of the tread.

The invention has been described with reference to a preferred embodiment. Obviously, modifications and alterations will occur to others upon a reading and understanding of this specification. It is intended to include all such modifications and alternations in so far as they come within the scope of the appended claims or the equivalents thereof.

Having thus described the invention, it is now claimed:

What is claimed is:

1. A tire tread die comprising an outer tread passage for forming an electrically non-conductive rubber outer tread, a lower undertread passage for forming a lower layer of electrically conductive rubber characterized by:

(a) a chimney block mounted in said outer tread passage and extending from an inner surface to an outer surface of said passage;

(b) a chimney block opening extending from one end of said chimney block to an opposite end;

(c) an undertread orifice in said outer tread passage in communication with said lower undertread passage and with said chimney block opening, said lower undertread passage having a recess at said lower undertread orifice for guiding said lower layer of electrically conductive rubber into said chimney block opening;

(d) a slot in a downstream side of said chimney block in communication with said chimney block opening and extending between said one end and said opposite end of said chimney block for communicating a narrow strip of said lower layer to said outer tread in said outer tread passage; and (e) a final die downstream of said outer tread passage and said lower undertread passage for receiving said lower layer and said outer tread with said narrow strip of lower layer extending from said undertread to an outer surface of said outer tread.

2. A tire tread die in accordance with claim 1 further characterized by said chimney block opening being a hole drilled through said chimney block into said lower undertread passage.

3. A tire tread die comprising an outer tread passage for forming an electrically non-conductive rubber outer tread, a lower undertread passage for forming a lower layer of electrically conductive rubber characterized by:

(a) a chimney block mounted in said outer tread passage and extending from an inner surface to an outer surface of said passage;

(b) a chimney block opening extending from one end of said chimney block to an opposite end;

(c) an undertread orifice in said outer tread passage in communication with said lower undertread passage and with said chimney block opening;

(d) a slot in a downstream side of said chimney block in communication with said chimney block opening and extending between said one end and said opposite end of said chimney block for communicating a narrow strip of said undertread lower layer to said outer tread in said outer tread passage;

(e) a final die downstream of said outer tread passage and said lower undertread passage for receiving said lower undertread layer and said outer tread with said narrow strip of lower undertread layer extending from said undertread to an outer surface of said outer tread; and (f) said chimney block being welded to an upper plate of said outer tread passage to provide said narrow strip of said lower layer in said outer tread without smearing.

4. The tire tread die of claim 1 further characterized by said chimney block having a flow separating protrusion at an upstream side of said chimney block.

5. A tire tread die comprising an outer tread passage for forming an electrically non-conductive rubber outer tread, a lower undertread passage for forming a lower layer of electrically conductive rubber characterized by:

(a) a chimney block mounted in said outer tread passage and extending from an inner surface to an outer surface of said passage;

(b) a chimney block opening extending from one end of said chimney block to an opposite end;

(c) an undertread orifice in said outer tread passage in communication with said lower undertread passage and with said chimney block opening;

(d) a slot in a downstream side of said chimney block in communication with said chimney block opening and extending between said one end and said opposite end of said chimney block for communicating a narrow strip of said undertread layer to said outer tread in said outer tread passage;

(e) a final die downstream of said outer tread passage and said lower undertread passage for receiving said lower undertread layer and said outer tread with said narrow strip of lower undertread layer extending from said undertread to an outer surface of said outer tread;

(f) said chimney block having a flow separating protrusion at an upstream side of said chimney block, said protrusion having a flow splitting tapered end at said upstream side and tapered walls from said upstream side to said downstream side of said chimney block to divert the flow of said outer tread around said chimney block.

* * * * *